June 11, 1957
I. B. BERLMAN ET AL
2,795,703
APPARATUS FOR COUNTING FAST NEUTRONS IN THE PRESENCE OF GAMMA RAYS
Filed March 16, 1954
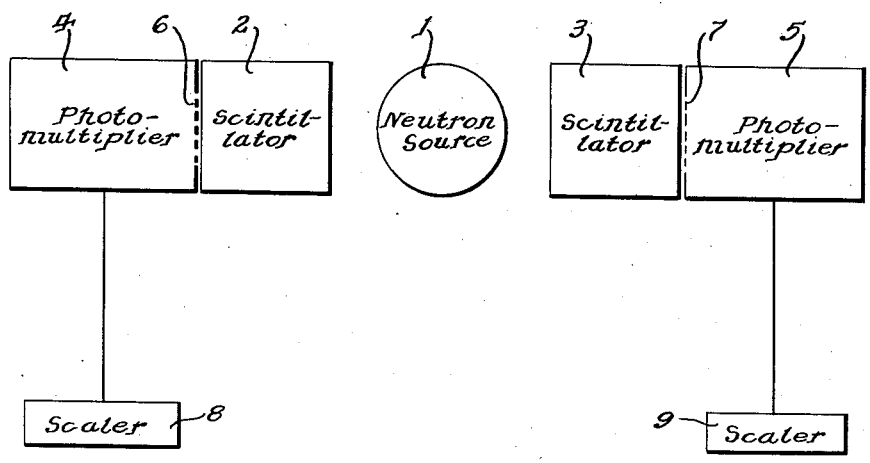
INVENTORS
Isadore B. Berlman
Leonidas D. Marinelli
BY
Roland A. Anderson
Attorney

United States Patent Office 2,795,703
Patented June 11, 1957

2,795,703

APPARATUS FOR COUNTING FAST NEUTRONS IN THE PRESENCE OF GAMMA RAYS

Isadore B. Berlman and Leonidas D. Marinelli, Chicago, Ill., assignors to the United States of America as represented by the United States Atomic Energy Commission Application March 16, 1954, Serial No. 416,722

13 Claims. (Cl. 250—71.5)

This invention deals with a method of determining the quantity of fast neutrons in the presence of gamma rays, and in particular with a method of determining the neutron density by means of scintillation counters. The method is also suitable for measuring gamma rays in the presence of fast neutrons.

The accompanying drawing is a diagrammatic representation of a scintillation counter assembly embodying the principles of the invention. The arrangement of the apparatus shown in the drawing is purely illustrative and can be modified within the scope of the claims.

In the drawing, the reference numeral 1 designates a source of fast neutrons and gamma rays. Containers 2 and 3 hold a first scintillation medium and a second scintillation medium, respectively. Numerals 4 and 5 denote photomultiplier tubes having windows 6 and 7, respectively. Numerals 8 and 9 designate scaling means.

Neutron densities have been measured heretofore in scintillation counters. For this purpose a layer of a scintillation medium, i. e. a medium containing a scintillator compound, is placed between the source of the neutron rays and the cathode of a photomultiplier tube. The neutrons when hitting the scintillation medium produce scintillations which then impinge on the cathode whereby they release electrons as the result of a photoelectric effect. The current pulses, that is, the number of electrons in each of various pulse height ranges, are recorded; the counts thus obtained are an indication of the number of neutrons and their energy distribution.

Scintillation counters have been found useful for determining the flux of fast neutrons in the energy region of from 1 to 15 m. e. v. However, these counters do not discriminate between various types of radiation, and gamma rays, for instance, when also present, are counted together with the neutrons.

It has now been found that the density or flux of fast neutrons can be determined in the presence of gamma rays if two separate measurements are made in the scintillation counter using two different scintillation media, a first and a second scintillation medium, respectively, the volumes of said two scintillation media being adjusted so that they contain the same amount of electrons and the first scintillation medium containing a considerably greater amount of hydrogen atoms than said second scintillation medium. By adjusting the two scintillation media to the same electron content and luminescent efficiency, the response of the two media to gamma rays has been made alike. However, the scintillation medium containing the greater amount of hydrogen atoms responds better to neutrons than the scintillator containing the lesser amount. The difference of the two readings then is an indication of the neutron density.

This concept is transformed into practice by using, for instance, two liquid scintillation media, both containing a, possibly the same, scintillator compound, but each having a different solvent therefor, the solvent for one scintillator having a great number of hydrogen atoms in the molecule, while the solvent for the other scintillator compound is a substitution product of the first solvent wherein most of the hydrogen atoms have been replaced by neutron-nonresponsive atoms such as, for instance, fluorine or deuterium. While this is the preferred embodiment, it is not necessary to employ solutions nor compounds of the same type. For instance, the readings obtained with a solid scintillation medium, e. g., with an anthracene crystal, may be compared with those obtained with a deuterated anthracene, or else the readings obtained with an anthracene or other crystal may be compared with those obtained using a solution, for instance a solution of terphenyl in xylene (after suitable correction because the anthracene gives larger pulses than the solution).

The best results were obtained with a solution containing 1.5 grams of 2,5-diphenyloxazole in 1 liter of xylene as the first scintillation medium and with a solution containing 5 grams of 2,5-diphenyloxazole in 1 liter of 1,4-bis (trifluoromethyl) benzene as the second scintillation medium; the volume ratio of first to second scintillator to provide the same number of electrons was 1.45.

For measuring the counts and pulse heights various types of scintillation counters known to those skilled in the art may be used. The arrangement preferred for the instant investigation comprised two glass containers with the respective scintillation media; they were successively placed between the source of neutron-gamma rays and a photomultiplier tube 5819. The scintillation medium was in contact with the window of the photomultiplier tube. A linear amplifier and a scaler completed the equipment.

It will be understood that this invention is not to be limited to the details given herein but that it may be modified within the scope of the appended claims.

What is claimed is:

1. A scintillation counter for measuring gamma rays in the presence of fast neutrons derived from one common source, comprising a photomultiplier tube; a window in said tube; a vessel containing a solution of 2,5-diphenyloxazole in 1,4-bis (trifluoromethyl) benzene interposed between said source and said tube and in contact with said window; and a counting means.

2. A device for measuring the density of fast neutrons in the presence of gamma rays derived from a common source, comprising two vessels, the first vessel containing a first scintillation medium and the second vessel containing a second scintillation medium, said two scintillation media containing the same amount of electrons but said first scintillation medium containing a considerably greater amount of hydrogen atoms than said second scintillation medium; and means for measuring the magnitude of the scintillations emanating from said vessels, including a photomultiplier, whereby the response of said measuring means to the scintillations from said first vessel minus the response of said measuring means to the scintillations from said second vessel is a function of the neutron density.

3. The counter of claim 2 in which the two scintillation media are solids.

4. The counter of claim 3 in which the first scintillation medium is an anthracene crystal and the second scintillation medium is a crystal of an anthracene compound in which hydrogen atoms have been replaced by deuterium.

5. The counter of claim 2 in which the first scintillation medium is a solid and the second scintillation medium is a solution of a scintillator compound.

6. The counter of claim 5 in which the solid scintillation medium is an anthracene crystal and the solution is a solution of terphenyl in xylene.

7. The counter of claim 2 in which the first scintillation medium is a solution of a scintillator compound in a solvent containing an essential amount of hydrogen atoms in the molecule and the second scintillation medium is a solution of the same scintillator compound in a solvent of the same type but in which the bulk of the hydrogen atoms have been replaced by neutron-nonresponsive atoms.

8. The counter of claim 7 in which the neutron-nonresponsive atoms are fluorine atoms.

9. The counter of claim 2 in which the first scintillation medium is a solution of 2,5-diphenyloxazole in xylene and the second scintillation medium is a solution of 2,5-diphenyloxazole in 1,4-bis (trifluoromethyl) benzene.

10. The counter of claim 9 in which the first scintillation medium contains 1.5 grams of 2,5-diphenyloxazole in 1 liter of xylene and the second scintillation medium contains 5 grams of 2,5-diphenyloxazole per 1 liter of 1,4-bis (trifluoromethyl) benzene.

11. As a new composition of matter, a scintillation medium comprising 2,5-diphenyloxazole dissolved in 1,4-bis (trifluoromethyl) benzene.

12. The scintillation medium of claim 11 wherein 5 grams of 2,5-diphenyloxazole is dissolved in 1 liter of 1,4-bis (trifluoromethyl) benzene.

13. As a new composition of matter, a scintillation medium comprising an anthracene crystal in which most of the hydrogen atoms have been replaced by deuterium.

References Cited in the file of this patent

UNITED STATES PATENTS

| 2,648,012 | Scherbatskoy | Aug. 4, 1953 |
| 2,698,906 | Reynolds et al. | Jan. 4, 1955 |

OTHER REFERENCES

An Anticoincidence Gamma-Ray Scintillation Spectrometer, from The Review of Scientific Instruments, by Richard D. Albert, vol. 24, No. 12, December 1953.

Two-Crystal Gamma-Ray Scintillation Spectrometer, by R. E. Connally, from The Review of Scientific Instruments, vol. 24, No. 6, June 1953.